United States Patent
Argent et al.

[11] Patent Number: 6,036,486
[45] Date of Patent: Mar. 14, 2000

[54] HEAT REGENERATION FOR OXY-FUEL FIRED FURNACES

[75] Inventors: Ronald D. Argent, Graysville; Christopher J. Hoyle, Houston; Gordon Dickinson, Eighty-Four, all of Pa.; Trevor Ward, Helmsley, United Kingdom

[73] Assignee: Frazier–Simplex, Inc., Washington, Pa.

[21] Appl. No.: 08/894,801

[22] PCT Filed: Jan. 24, 1997

[86] PCT No.: PCT/US97/01053

§ 371 Date: Aug. 28, 1997

§ 102(e) Date: Aug. 28, 1997

[87] PCT Pub. No.: WO97/27441

PCT Pub. Date: Jul. 31, 1997

Related U.S. Application Data

[60] Provisional application No. 60/010,579, Jan. 25, 1996.

[51] Int. Cl.[7] ................................................ F27D 17/00
[52] U.S. Cl. ................................................ 432/180; 432/179
[58] Field of Search ........................... 432/13, 179, 180, 432/196

[56] References Cited

U.S. PATENT DOCUMENTS

| | | |
|---|---|---|
| 3,207,493 | 9/1965 | Swain ................................. 432/180 |
| 3,633,886 | 1/1972 | Froberg . |
| 3,870,474 | 3/1975 | Houston ............................. 432/180 |
| 3,872,918 | 3/1975 | Stalker . |
| 4,310,342 | 1/1982 | Richards . |
| 4,338,112 | 7/1982 | Propster . |
| 4,409,011 | 10/1983 | Hohman et al. . |
| 4,528,012 | 7/1985 | Sturgill . |
| 4,604,051 | 8/1986 | Davies et al. . |
| 4,676,744 | 6/1987 | Wray et al. . |
| 4,874,311 | 10/1989 | Gitman . |
| 5,098,286 | 3/1992 | York . |
| 5,161,517 | 11/1992 | Johansson . |
| 5,401,165 | 3/1995 | Smith . |

OTHER PUBLICATIONS

Air Products and Chemicals, Inc., Development of an Advanced Glass Melting System—The Thermally Efficient Alternative Melter, Feb. 1992, p. 138.

John Bost, The Use of Waste–Heat Gases from a Glass Furnace to Operate a Turbine, pp. 37–42.

Gordon Dickinson, Regenerative Burners and the Glass Industry, Journal of the Canadian Ceramic Society, vol. 62, No. 3, Aug. 1993, pp. 187–196.

*Primary Examiner*—John A. Jeffery
*Assistant Examiner*—Gregory A. Wilson
*Attorney, Agent, or Firm*—Webb Ziesenheim Logsdon Orkin & Hanson, P.C.

[57] ABSTRACT

A cassette regeneration system (10) for an oxy-fuel regeneration assembly (52) having oxy-fuel burners (54) includes a first regeneration assembly (62) having at least one removably connected cassette regenerator (32), a second regeneration assembly (62') having at least one removably connected cassette regenerator and an exhaust reversal valve assembly (82) in flow communication with the first and second regeneration assemblies and configured to selectively direct exhaust gas from the furnace to a selected one of the first and second regeneration assemblies. The system further includes an air supply conduit (98), at least one preheated air conduit (102) and an air reversal valve assembly (80) in flow communication with the air supply conduit and the at least one preheated air conduit and configured to selectively direct air from the air supply air conduit to a selected one of the first and second regeneration assemblies to the at least one preheated air conduit.

28 Claims, 2 Drawing Sheets

HEAT REGENERATION FOR OXY-FUEL FIRED FURNACES

This application claims priority of Provisional Application Ser. No. 60/010,579 filed Jan. 25, 1996.

BACKGROUND OF THE INVENTION

1. Field of the Invention

The invention relates generally to the recovery of heat from furnaces and, more particularly, the recovery of heat from fuel fired furnaces utilizing cassette regenerators.

2. Description of the Prior Art

Most commercial glass is produced in high temperature air/fuel furnaces where solid raw materials are melted, reacted to form stabilized silicates and degassed of entrained gases to allow downstream forming of a homogeneous product. Energy input to the furnace in the form of natural gas or oil firing and electrical resistance heating (electric boosting) melts the raw materials, provides heat of reaction and raises the molten temperature while decreasing viscosity to allow for proper degassing of the glass. The vast majority of these furnaces use air to support combustion. Different furnace designs have evolved in each segment of the glass industry which are specifically tailored to the particular demands of the end use product. Examples of traditional furnace designs include the regenerative melter, recuperative melter, all-electric melter and direct fired unit melter.

By far, the dominant furnace design for the glass industry is the regenerative melter. A typical regenerative melter includes at least two burners, two regenerators, a flow reversal system and associated controls. Paired sets of burners are located on opposed sides of the furnace or are end port fired where both systems are on the same wall of the furnace. A heat regenerator communicates with each burner. The burners and regenerators are closely coupled by a length of refractory lined duct to suit the space available on site. When the first burner of a pair fires, using combustion air fed to the base of its regenerator, the second burner of the pair acts as an exhaust port drawing off waste gas, thereby heating the regenerator for the second burner. When this heated regenerator is sufficiently charged, the reversal system operates to reverse the firing system. The second burner of the pair fires to heat the furnace and the first burner, in time, acts as an exhaust port, thereby heating the regenerator for the first burner. The combustion air is then directed through the hot regenerator of the second burner to preheat the air prior to combustion. After a period of time, the flow of exhaust gases and combustion air through the regenerators is again reversed to maintain heating of the combustion air.

These regenerators typically take the form of latticed brick work or "checkers" through which the combustion air passes on its way to the burner to preheat the combustion air and through which the exhaust gases from the furnace pass on their way to the stack. The exhaust gases transfer their sensible heat to the regenerator bricks as they pass through. On the reverse cycle, clean combustion air brought in at ambient temperature is passed through the previously heated regenerator of the firing burner and thus picks up sensible heat from the bricks. In this way, the regenerator preheats the air prior to combustion.

In an alternative traditional furnace design, recuperative heat exchangers, rather than regenerators, are used to preheat the combustion air. Recuperative heat exchangers differ from regenerative heat exchangers in that the exhaust gases and combustion air flow through different piping systems and do not mix. The recuperator acts as a simple indirect heat exchanger. Heat from the exhaust gases flowing through one conduit is transferred to combustion air flowing through another conduit.

As an alternative to conventional air/fuel furnaces, oxy-fuel fired furnaces have been developed. In an oxy-fuel fired furnace, oxygen gas instead of air is used to support combustion. Unlike conventional air/fuel furnaces, the oxygen is not preheated prior to being mixed with the fuel such as natural gas or oil. Therefore, no regenerators or recuperators are typically associated with oxy-fuel fired furnaces. Oxy-fuel fired furnaces offer some advantages over typical air/fuel furnaces, such as generally lower $NO_x$ concentrations. However, oxy-fuel furnaces, as a general rule, are more expensive to operate since the oxygen must be purchased for use in the furnace.

Glass manufacturing, generally speaking, is a high temperature, energy intensive operation where approximately 65–70% of the total energy is consumed in the melting process. Typical air/fuel fired glass melting furnaces have about 30% of their total input energy lost through the exhaust stack. Recently, there have been attempts to utilize the sensible heat in the exhaust from conventional air-fuel fired regenerative furnaces to perform useful work, such as supplying hot gases to run a turbine. In the initial attempts to use the exhaust gases from regenerative melting furnaces to run a turbine, the hot exhaust gases were cooled and supplied directly to the turbine. However, use of the exhaust gases to directly turn the turbine resulted in considerable erosion of the turbine and turbine blades due to the high amounts of particulate matter and corrosives present in the exhaust gases. Therefore, heating methods using recuperator-type heat exchangers were developed to prevent damage to the turbine blades.

One such method is disclosed in U.S. Pat. No. 4,528,012 to Sturgill. In the Sturgill patent, a typical regenerative glass melting furnace is fired by preheated air/fuel burners. Incoming combustion air is heated in a checker-type regenerator. Exhaust gas exits the opposite side of the furnace to give up its heat to another checker-type regenerator. Exhaust gas leaves the second regenerator and is directed to a recuperator-type heat exchanger. The exhaust stream flows through the recuperator and out an exhaust stack. Ambient air is fed into a filter and then to a compressor attached to a turbine. The incoming air is compressed and is fed through different piping in the recuperator where it is heated by the exhaust gas from the furnace. The compressed, preheated air is then fed to a turbine which rotates a shaft to run the compressor. The turbine shaft may also be connected to a generator to generate electrical power. The exhaust from the turbine becomes a source of preheated combustion air that is added to the checker-type regenerator. The exhaust gases which pass through the recuperator do not come in direct contact with the ambient air. While the recuperative heat recovery system disclosed in the Sturgill patent permits beneficial use of the exhaust gas, i.e., to turn the turbine, the costs involved in constructing and maintaining such recuperators adversely impacts upon the benefits derived from the use of the exhaust gas. Further, these recuperators are prone to clogging and therefore must be cleaned on a regular basis to prevent significant losses in thermal conductivity.

To date, little effort has been made to utilize the heat from the exhaust gas of high temperature furnaces, such as oxy-fuel furnaces, for alternative purposes. Use of standard regenerators in oxy-fuel systems is not advisable due to the large costs involved in construction and maintenance. Further, standard regenerators do not typically reduce the particulate concentration to an acceptable level for use in turbines. With respect to standard recuperators, the costs involved in constructing and maintaining such recuperators are prohibitive. Further, standard recuperators are prone to clogging and are difficult to clean and maintain.

Therefore, it is an object of the invention to provide a high temperature furnace system with a simple replaceable regenerator system in which the hot exhaust gases from the furnace can be used to power a turbine without the need for a complex recuperation system. It is a further object of the invention to provide an oxy-fuel furnace system in which the exhaust gas is used to run a turbine for powering an oxygen generator. The oxygen so generated is then used in the oxy-fuel furnace. It is also an object of the invention to provide a replaceable cassette regenerator heat exchanger system to recover waste heat from an oxy-fuel furnace system to preheat air for use in a turbine.

SUMMARY OF THE INVENTION

A regeneration system of the invention for a high temperature furnace having oxy-fuel burners or a combination of oxy-fuel burners and air-fuel burners includes a first regeneration assembly having at least one removably connected cassette regenerator, a second regeneration assembly having at least one removably connected cassette regenerator and an exhaust reversal valve assembly in flow communication with the first and second regeneration assemblies and configured to selectively direct exhaust gas from the furnace to a selected one of the first and second regeneration assemblies. The system further includes an air supply conduit, at least one preheated air conduit and an air reversal valve assembly in flow communication with the air supply conduit and the at least one preheated air conduit and configured to selectively direct air from the air supply conduit to a selected one of the first and second regeneration assemblies and to the at least one preheated air conduit.

A further cassette regeneration system of the invention for an oxy-fuel fired furnace having oxy-fuel burners includes a first regenerator assembly having at least one removably connected first cassette regenerator, a first exhaust manifold assembly in flow communication with the at least one first cassette regenerator, a first exhaust manifold assembly in flow communication with the at least one cassette regenerator and a first regenerator header in flow communication with the at least one cassette regenerator. A second regenerator assembly includes at least one removably connected second cassette regenerator, a second exhaust manifold assembly in flow communication with the at least one second cassette regenerator and a second regenerator header in flow communication with the at least one second cassette regenerator. An exhaust reversal valve assembly is provided in flow communication with the first and second regenerator assemblies and is configured to selectively direct exhaust from the furnace through a selected one of the first and second regenerator assemblies. An air reversal valve assembly is in flow communication with the first and second regenerator headers. An air supply conduit is in flow communication with the air reversal valve assembly. The air reversal valve assembly is configured to selectively direct air flow through a selected one of the first and second cassette regenerators. A preheated air conduit is in flow communication with the air reversal valve assembly.

A method of heat recovery of the invention for an oxy-fuel fired furnace having oxy-fuel burners, includes the steps of directing exhaust from the furnace to an exhaust reversal valve assembly and selectively directing the exhaust through the exhaust reversal valve assembly to a first regenerator assembly. The first regenerator assembly includes at least one removable cassette regenerator having filter media. Exhaust gas is passed through the selected first regenerator assembly to heat the filter media in the first regenerator assembly. Air is directed to an air reversal valve assembly. The method further includes selectively directing the air through the air reversal valve assembly into a second regenerator assembly having at least one removable cassette regenerator to heat the air and directing the heated air to a turbine to turn the turbine.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
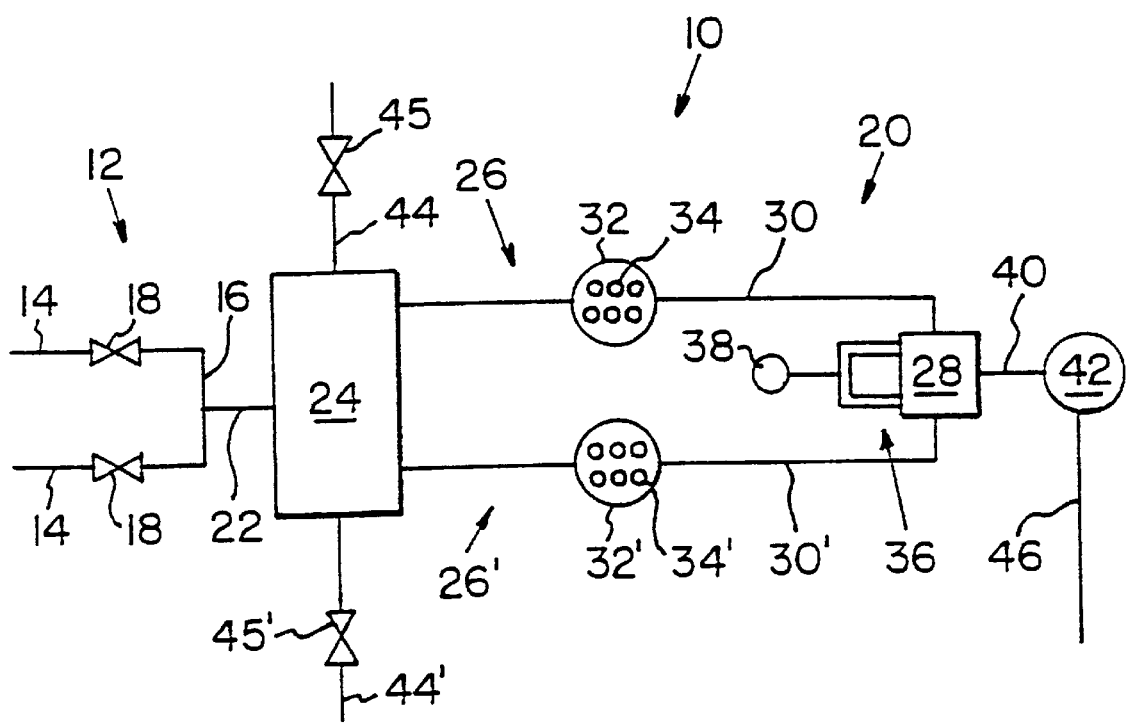
FIG. 1 is a schematic view of a cassette regeneration system of the invention.

For purposes of the description hereinafter, the terms "upper", "lower", "right", "left", "top", "bottom", "side", "vertical", "horizontal" and derivatives thereof shall relate to the invention as it is oriented in the drawing figures. However, it is to be understood that the invention may assume various alternative orientations and step sequences, except where expressly specified to the contrary. It is also to be understood that the specific devices and processes illustrated in the attached drawings, and described in the following specification, are exemplary embodiments of the inventive concepts defined in the appended claims. Hence, the specific dimensions and other physical characteristics relating to the embodiments disclosed herein are not to be considered as limiting, unless the claims expressly state to the contrary.

A cassette regeneration system in accordance with the invention is generally designated 10 in FIG. 1 of the drawings. In the regeneration system 10, the exhaust from a high temperature furnace, such as an oxy-fuel fired glass furnace, flows through a by-pass flue system 12. The by-pass flue system 12 includes a pair of by-pass flues 14 in flow communication with the furnace exhaust. The by-pass flues 14 are cross-connected by a conduit 16. Each by-pass flue 14 includes a shut-off damper 18. A heat recovery assembly 20 is in flow communication with the by-pass flue system 12. The heat recovery assembly 20 includes an exhaust conduit 22 in flow communication with the by-pass flue system 12 and a hot exhaust reversal valve 24. A pair of regeneration assemblies 26, 26' extends between the hot exhaust reversal valve 24 and air reversal valve assembly 28. Each regeneration assembly 26, 26' includes a regeneration conduit 30, 30' in flow communication with a cassette regenerator 32, 32'.

Each cassette regenerator 32, 32' is lined with refracting bricks and contains heat absorbing filter media 34, 34' such as a plurality of tabular alumina balls of about ¾" in diameter. As will be explained in greater detail hereinafter, the alumina balls recover sensible heat rapidly from the exhaust gases and also filter out particulate matter from the waste gas. In the reverse flow mode, the alumina balls rapidly give-up the stored heat to incoming ambient air, without releasing appreciable particulate matter thereto.

Each cassette regenerator 32, 32' is mounted on wheels and is connected to its associated regeneration conduit 30, 30' by quick release fittings. This permits quick and easy replacement of a cassette regenerator when the media 34 becomes dirty. Cassette regenerators of this general type are manufactured by Engineered Combustion Systems, Inc. of Bridgeville, Pa. (Model Nos. RCB20/26-RCB100/120). An air supply conduit 36 extends between the air reversal valve assembly 28 and a supply fan 38. An outlet conduit 40 is in flow communication with the exhaust gas drawn through the filter media 34 of a selected one of the cassette regenerators 32, 32'. An exhaust fan 42 is in flow communication with the outlet conduit 40. Each regeneration conduit 30, 30' has a preheated air conduit 44, 44' in flow communication therewith. Each preheated air conduit 44, 44' has a shut-off valve 45, 45'. A discharge conduit 46 is in flow communication with the exhaust fan 42.

Figure 2:
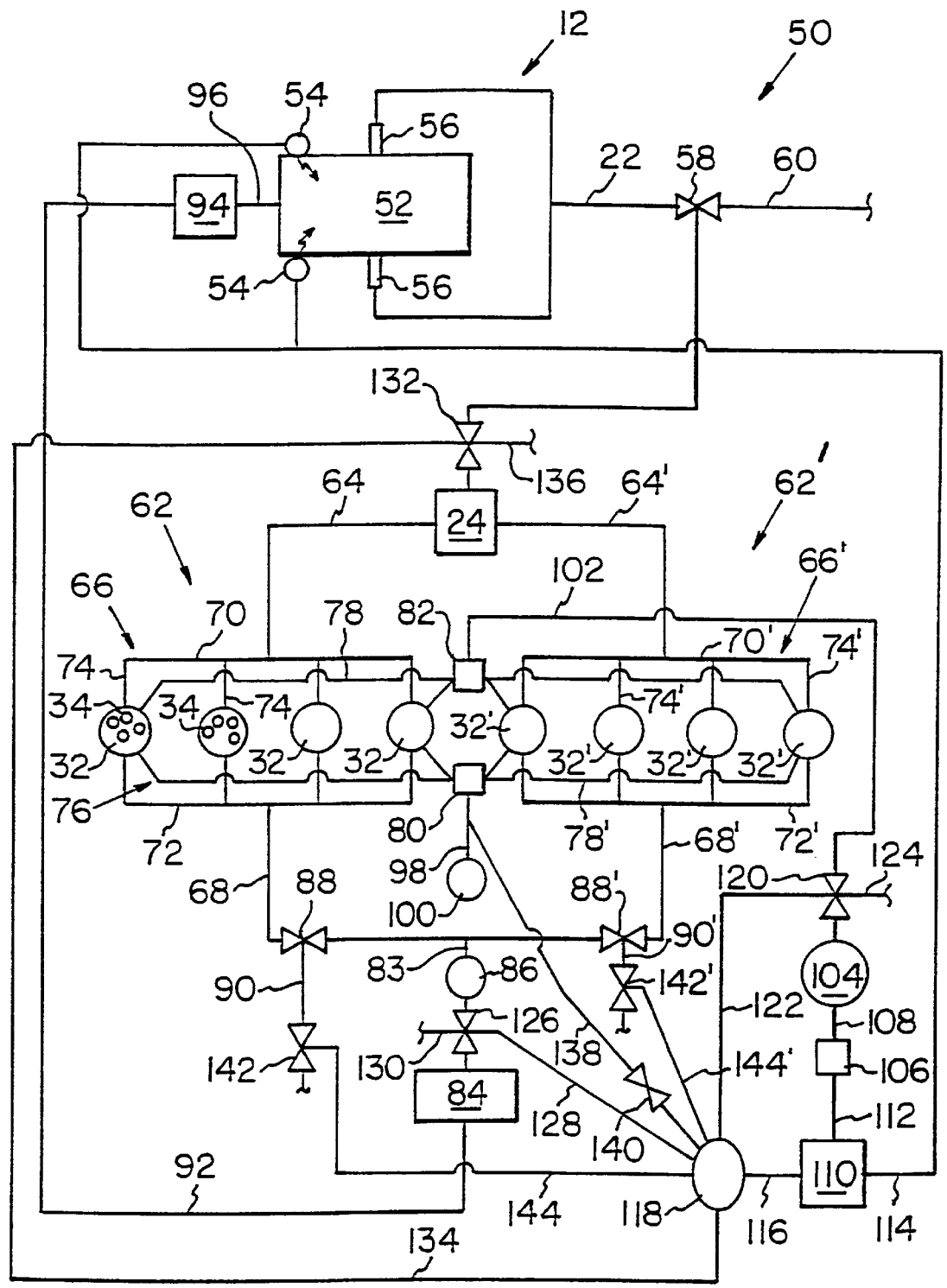
FIG. 2 is a schematic view of an oxy-fuel furnace system utilizing the cassette regeneration system of the invention.

An oxy-fuel furnace system utilizing a heat recovery system of the invention is generally designated 50 in FIG. 2 of the drawings. The system 50 includes a high temperature furnace, such as an oxy-fuel furnace 52, having a pair of oxy-fuel burners 54 firing into the furnace 52. A pair of outlet ducts 56 are in flow communication with the interior of the furnace 52 and a by-pass flue system 12. An exhaust conduit 22 extends between the by-pass flue system 12 and a hot exhaust reversal valve 24. A hot exhaust by-pass valve 58 is located in the exhaust conduit 22 and is in flow communication with the exhaust conduit 22 and a discharge conduit 60. The hot exhaust reversal valve 24 is in flow communication with a first regeneration assembly 62 and a second regeneration assembly 62'. Since each regeneration assembly is identical, only the first regeneration assembly 62 will be described in detail. Like components in the second regeneration assembly are designated with a prime (') symbol in FIG. 2 of the drawings. The first regeneration assembly 62 includes an inlet conduit 64, an exhaust manifold assembly 66 and an outlet conduit 68. The exhaust manifold assembly 66 includes an inlet manifold 70, an outlet manifold 72 and a plurality of cross conduits 74 extending between, and in flow communication with, the inlet manifold 70 and the outlet manifold 72.

A cassette regenerator 32 is in flow communication with each cross conduit 74. The regenerators 32 are preferably connected to the cross conduits 74 by quick release couplings. Each cassette regenerator 32 is also connected to, and in flow communication with, a regenerator header assembly 76. The regenerator header assembly 76 includes a first regenerator header 78 associated with the first regeneration assembly 62 and a second regenerator header 78' associated with the second regeneration assembly 62'. A first or cold air reversal valve 80 and a second or preheated air reversal valve 82 are located in the regenerator header assembly 76 between the first 78 and second 78' regenerator headers.

The outlet conduit 68 extends between the outlet manifold 72 and a discharge conduit 83. A cullet preheater 84 and an exhaust fan 86 are located in flow communication with the discharge conduit 83. The outlet conduit 68 includes a cullet preheat by-pass valve 88 in flow communication with a cullet by-pass duct 90. A cullet preheat conduit 92 extends between the cullet preheater 84 and a cullet charger 94. A cullet charging conduit 96 extends between the cullet charge 94 and the furnace 52.

An air supply conduit 98 extends between a supply fan 100 and the first reversal valve 80 located in the regenerator header assembly 76. A preheated air conduit 102 extends between the second reversal valve 82 located in the regenerator header assembly 76 and an inlet to a turbine 104. The turbine 104 is connected to an electrical power generator 106 by a shaft 108. The electrical power generator 106 is connected to an oxygen generator 110, such as a conventional V.P.S.A. oxygen generator, by a power transmission line 112. An oxygen conduit 114 extends between the oxygen generator 110 and the oxy-fuel burners 54. A nitrogen supply conduit 116 extends between the oxygen generator 110 and a nitrogen store 118.

An air conduit nitrogen valve 120 is located in the preheated air conduit 102 and a first nitrogen conduit 122 extends between the nitrogen store 118 and the air conduit nitrogen valve 120. The air conduit nitrogen valve 120 is in flow communication with a nitrogen exhaust conduit 124. A discharge conduit nitrogen valve 126 is located in the discharge conduit 83. A second nitrogen conduit 128 extends between the discharge conduit nitrogen valve 126 and the nitrogen store 118. The discharge conduit nitrogen valve 126 is also in flow communication with a nitrogen exhaust conduit 130. An exhaust conduit nitrogen valve 132 is located in the exhaust conduit 22. A third nitrogen conduit 134 extends between the exhaust conduit nitrogen valve 132 and the nitrogen store 118. The exhaust conduit nitrogen valve 132 is also in flow communication with a nitrogen exhaust conduit 136. A nitrogen inlet conduit 138 extends between the nitrogen store 118 and the air supply conduit 98. A shut-off valve 140 is located in the nitrogen inlet conduit 138. A by-pass duct nitrogen valve 142, 142' is located in each cullet by-pass duct 90, 90'. Nitrogen conduits 144, 144' extend between the nitrogen store 118 and the by-pass duct nitrogen valves 142, 142', respectively.

Operation of the cassette regeneration system 10 shown in FIG. 1 of the drawings will now be described. Exhaust gas from an oxy-fuel fired glass furnace flows through the by-pass flues 14. The shut-off dampers 18 enable the heat recovery assembly 20 to be by-passed, thus enabling the original flue passageways to be reused at any time. The hot exhaust gas from the furnace passes through the exhaust conduit 22 into the hot exhaust reversal valve 24 and is directed to one of the regeneration assemblies 26, 26'. Assuming regeneration assembly 26 is selected, the hot exhaust gas flows through the selected regeneration conduit 30 into the selected cassette regenerator 32 and through the filter media 34. The exhaust gas is drawn through the cassette regenerator 32 by the exhaust fan 42 and into the discharge conduit 46. Within the cassette regenerator 32, the flue gas inlet temperatures are on the order of about 2,300–2,600° F. The exhaust gas temperature exiting the cassette regenerator 32 is much lower, on the order of about 500° F. This low temperature exhaust stream is relatively clean since the tabular alumina balls in the cassette regenerator 32 act as a particulate filter. About 85% of carryover is filtered out by the filter media 34 of the cassette regenerator 32. This lower temperature exhaust stream can be used for cullet preheating, for example, or it may be exhausted into the original flue system or into the atmosphere.

The supply fan 38 blows ambient air through the air supply conduit 36 and into the reversal valve assembly 28 where it is directed to the other regeneration assembly 26' which does not have exhaust gas flowing therethrough. As the ambient air flows through the filter media 34' of the other cassette regenerator 32', the air picks up sensible heat from the filter media 34'. This preheated air is on the order of about 300° F. lower in temperature than the exhaust gas leading to the cassette regenerators 32, 32' (i.e., about 2,000–2,300° F.). This preheated air is directed to the preheated air conduit 44' and may then be used for power generation, such as power to operate oxygen generation plants, power to operate compressors, power for electric boosting in the melting furnace, power for electric furnaces and forehearths and power for refrigeration systems. The preheated air may also be used for batch or cullet preheating, mold heating, lehr heating, combustion preheating air for non-oxy-fuel fired furnaces or distributors, heating for hot ribbon return systems and the manufacture of light bulbs or heating for mandrel chambers in Danner tube drawing manufacture.

The reversal of the hot exhaust/preheated air flow directions is linked to the reversal of low temperature exhaust/cold air for preheating. The time duration for the cycle will be a function of protecting the cassette regenerators 32, 32' against overheating. When the time comes to reverse the flow of the system described above, the hot exhaust reversal valve 24 and air reversal valve assembly 28 are switched so that the hot exhaust gas from the furnace is directed to the other cassette regenerator 32' and the cold supply air is directed to the hot cassette regenerator 32.

When the time comes to replace one of the cassette regenerators 32, 32', the shut-off dampers 18, 18' can be used to by-pass the heat recovery assembly 20. The regenerator 32, 32' to be replaced is then simply uncoupled from the respective regeneration conduit 30, 30' and wheeled away. A new regenerator 32, 32' can then be wheeled into place and connected to the regeneration conduit 30, 30'.

The cassette regeneration system 10 of the invention can be employed as a stand alone option for use in connection with a glass making furnace or other furnace not only to generate power for potential oxygen generation for use in the oxy-fuel burners and not only as a mechanism to conveniently lower the exhaust temperature so that it can be employed for cullet preheating, but the cassette regenerator can be used as a hot primary filter, filtering the particulates from the furnace exhaust stream. In the event a heavy fuel oil is employed in the oxy-fuel firing, the particulate bed of the cassette regenerator lowers the exhaust temperature to a point where cold $SO_x$ removal technologies can be applied.

Operation of the cassette regeneration system 50 shown in FIG. 2 of the drawings will now be described. The oxy-fuel burners 54 fire into the oxy-fuel furnace 52 to melt the glass or cullet located in the furnace. Hot exhaust gases flow from the furnace 52 through the outlet ducts 56 and the by-pass flue system 12 into the exhaust conduit 22. The hot exhaust by-pass valve 58 can be used to by-pass the cassette regeneration system 10 by directing the exhaust to the discharge conduit 60. In the normal operating mode, the hot exhaust by-pass valve 58 directs the exhaust gases through the exhaust conduit 22 to the hot exhaust reversal valve 24. When the hot exhaust reversal valve 24 is positioned to the left, as shown in FIG. 2 of the drawings, the exhaust gas is sent through the inlet conduit 64 to the exhaust gas inlet manifold 70.

The exhaust gas flows into the cross conduits 74, through the cassette regenerators 32 and into the exhaust gas outlet manifold 72. As the exhaust gas flows through the regenerators 32, sensible heat from the exhaust gas is transferred to the filter media 34 and particulate matter is filtered out of the exhaust gas stream and is collected on the surface of the filter media 34. The exhaust gas is drawn through the outlet conduit 68 by the exhaust fan 86. The filtered and cooled exhaust gas leaves the cassette regenerators 32 at a temperature of about 500° F. This cooled exhaust gas flows through the outlet conduit 68 and discharge conduit 83 to the cullet preheater 84. If cullet preheating is not required, the cullet preheat by-pass valve 88 is opened. The filtered and cooled exhaust gas is thus sent directly to the atmosphere or may also be directed back into the by-pass flue system 12. The exhaust gas from the cullet preheater 84 flows through the cullet preheat conduit 92 and into the cullet charger 94. Cullet preheated in the cullet preheater 84 is charged into the feed of the furnace 52 via the cullet charger 94 and cullet charging conduit 96.

The supply fan 100 blows atmospheric air through the air supply conduit 98 to the first reversal valve 80. The first reversal valve 80 is positioned to direct the air to the regenerator header 78, 78' of the regenerator header assembly 76 which is not currently in use to filter the exhaust gas. In the flow pattern described thus far, this would be the second regenerator header 78' on the right side of FIG. 2 of the drawings. The atmospheric air flows through the second regenerator header 78' and associated cassette regenerators 32' to the second reversal valve 82. As the atmospheric air flows through the cassette regenerators 32', the sensible heat of the filter media 34' is transferred to the atmospheric air to preheat the air to a temperature of about 2,000–2,300° F. This preheated air is directed by the second reversal valve 82 into the preheated air conduit 102 to the inlet of the turbine 104. The turbine 104 powers an electrical power generator 106 via the shaft 108. The power from the electrical power generator 106 is supplied to the oxygen generator 110 and is used to operate an oxygen generator 110. The oxygen produced in the oxygen generator 110 flows through the oxygen conduit 114 to the oxy-fuel burners 54 and is used for combustion in the furnace 52. The nitrogen by-product formed in the oxygen generator 110 flows through the nitrogen supply conduit 116 into the nitrogen store 118.

If necessary, cooler nitrogen gas from the nitrogen store 118 may be transported through the second nitrogen conduit 128 to the discharge conduit nitrogen valve 126 to control the cullet preheating temperature by diluting the exhaust gas stream exiting from the cassette regenerators 32. Excess nitrogen gas may be bled off through the nitrogen exhaust conduit 130. Similarly, cooler nitrogen gas may also be used to control the turbine inlet gas temperature by directing nitrogen gas through the first nitrogen conduit 122 to the air conduit nitrogen valve 120. Excess nitrogen may be bled off via the nitrogen exhaust conduit 124. Cooler nitrogen gas may also by supplied through the third nitrogen conduit 134 to the nitrogen exhaust conduit valve 132 to control the exhaust gas temperature prior to entry into the hot exhaust reversal valve 24 and cassette regenerators 32 if the temperature of the exhaust from the furnace 52 is too high for feeding directly into the cassette regenerators 32. In addition to powering the oxygen generator 110, the turbine 104 can also be used to produce electricity to power electrical boosting elements in the furnace. In an alternative configuration, the supply fan 100 can be disengaged and nitrogen gas can be supplied directly to the air supply conduit 98 through the nitrogen inlet conduit 138 so that the nitrogen gas is preheated and used to power the turbine 104 in a similar manner as discussed above with respect to preheating of the air.

Additionally, nitrogen gas from the nitrogen store 118 can be directed to the by-pass duct nitrogen valve 142, 142' for the regeneration assembly 62, 62' in use through the respective nitrogen conduits 144, 144'. The nitrogen gas can thus be mixed with the exhaust gas prior to discharging the exhaust gas mixture to the atmosphere. The addition of the nitrogen gas to the exhaust gas stream increases the total volume of the exhaust being discharged and thus decreases the concentration per unit volume of $NO_x$ in the discharged exhaust gas. The nitrogen from the nitrogen store 118 can also be directed to the discharge conduit 60 to be mixed with the exhaust gas to decrease the concentration of $NO_x$ in the discharged exhaust gas.

After a time, the regenerators 32 on the left side of the system 10 shown in FIG. 2 of the drawings become charged and the flow pattern of the system 10 must be changed. To reverse the flow pattern, the hot exhaust reversal valve 24 is shifted to the right to port the exhaust gases to the cassette regenerators 32' on the right side of FIG. 2 of the drawings. The first 80 and second 82 reversal valves are shifted to port the atmospheric air from the supply fan 100 to the first regenerator header 78 on the left side of FIG. 2 of the drawings, through the hot regenerators 32 and into the preheated air conduit 102.

After repeated uses, the filter beds in the cassette regenerators 32, 32' must be cleaned. A cassette regenerator 32 that requires cleaning is simply unclamped from its respective cross conduit 74, 74' and regenerator header 78, 78' and a new cassette regenerator 32 is wheeled into place and clamped into the system 10. In order to facilitate the changing of a dirty cassette regenerator 32, each cross conduit 74, 74' and regenerator header 78, 78' may include isolation valves to isolate the cassette regenerator 32 to be changed from the gas flow through the cross conduit 74, 74' and regenerator header 78, 78'. The entire replacement of a regenerator therefore only takes on the order of a few minutes.

The dirty or blocked filter media 34 can then be cleaned after the filter media 34 has cooled. In order to clean the filter media 34, the alumina balls in the bed are removed from the cassette regenerator 32 and placed in a mixer device, such as a cement mixer, to tumble the balls. After tumbling for a period of time, the particulate matter is removed from the media 34 and the balls can be returned for reuse in one of the cassette regenerators 32. In most instances, the particulate material recovered from the alumina balls may be placed back into the cullet charger 94 for reuse and recovery in the glass melting process. This feature is particularly attractive when manufacturing materials made from expensive constituents which become air born in the furnace off gases. For example, in the manufacture of borosilicate glasses, expensive boron compounds leave the furnace in the exhaust gases and can be recovered in the cassette regenerators for reuse after the balls are cleaned, in the manner described above.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiment described in detail herein are illustrative only and are not limiting to the scope of the invention which is to be given the full breadth of the appended claims and any and all equivalents thereof. For example, although the preceding discussion focused principally on the use of the regeneration system of the invention with oxy-fuel glass furnaces, it is to be understood that the system is not limited to glass furnace applications. Additionally, the system can also be used in furnaces having a combination of oxy-fuel and air-fuel burners.

What is claimed is:

1. A regeneration system for a high temperature furnace having at least one of oxy-fuel burners and air-fueled burners, said system comprising:

a first regeneration assembly having at least one removably connected cassette regenerator;

a second regeneration assembly having at least one removably connected cassette regenerator;

an exhaust reversal valve assembly in flow communication with said first and second regeneration assemblies and configured to selectively direct exhaust gas from the furnace to a selected one of said first and second regeneration assemblies;

an air supply conduit;

at least one preheated air conduit; and an air reversal valve assembly in flow communication with said air supply conduit and said at least one preheated air conduit and configured to selectively direct air from said air supply conduit to a selected one of said first and second regeneration assemblies to said at least one preheated air conduit.

2. A regeneration system for a high temperature furnace having at least one of oxy-fuel burners and air-fueled burners, said system comprising:

a first regeneration assembly having at least one removably connected cassette regenerator;

a second regeneration assembly having at least one removably connected cassette regenerator;

an exhaust reversal valve assembly in flow communication with said first and second regeneration assemblies and configured to selectively direct exhaust gas from the furnace to a selected one of said first and second regeneration assemblies;

an air supply conduit;

at least one preheated air conduit;

an air reversal valve assembly in flow communication with said air supply conduit and said at least one preheated air conduit and configured to selectively direct air from said air supply conduit to a selected one of said first and second regeneration assemblies to said at least one preheated air conduit; and a turbine in flow communication with said at least one preheated air conduit.

3. A regeneration system for a high temperature furnace having at least one of oxy-fuel burners and air-fueled burners, said system comprising:

a first regeneration assembly having at least one removably connected cassette regenerator;

a second regeneration assembly having at least one removably connected cassette regenerator;

an exhaust reversal valve assembly in flow communication with said first and second regeneration assemblies and configured to selectively direct exhaust gas from the furnace to a selected one of said first and second regeneration assemblies;

an air supply conduit;

at least one preheated air conduit;

an air reversal valve assembly in flow communication with said air supply conduit and said at least one preheated air conduit and configured to selectively direct air from said air supply conduit to a selected one of said first and second regeneration assemblies to said at least one preheated air conduit; and a by-pass flue system in flow communication with said exhaust reversal valve assembly.

4. The regeneration system as claimed in claim 3, wherein said by-pass flue system includes at least one shut-off valve configured to prevent exhaust gas flowing into said exhaust reversal valve assembly.

5. A cassette regeneration system for an oxy-fuel fired furnace having oxy-fuel burners, said system comprising:

a first regeneration assembly, said first regeneration assembly including at least one removably connected first cassette regenerator, a first exhaust manifold assembly in flow communication with said at least one first cassette regenerator and a first regenerator header in flow communication with said at least one first cassette regenerator;

a second regeneration assembly, said second regeneration assembly including at least one removably connected second cassette regenerator, a second exhaust manifold assembly in flow communication with said at least one second cassette regenerator and a second regenerator header in flow communication with said at least one second cassette regenerator;

an exhaust reversal valve assembly in flow communication with said first and second regeneration assemblies configured to selectively direct exhaust from the furnace through a selected one of said first and second regeneration assemblies;

an air reversal valve assembly in flow communication with said first and second regeneration headers;

an air supply conduit in flow communication with said air reversal valve assembly, wherein said air reversal valve assembly is configured to selectively direct air flow through a selected one of said first and second cassette regenerators; and a preheated air conduit in flow communication with said air reversal valve assembly.

6. The system as claimed in claim 5, including an outlet conduit in flow communication with said first and second regeneration assemblies and a cullet preheater conduit in flow communication with said outlet conduit and a cullet preheater.

7. The system as claimed in claim 5, including a turbine in flow communication with said preheated air conduit.

8. The system as claimed in claim 7, including an electrical power generator connected to said turbine.

9. The system as claimed in claim 8, including an oxygen generator powered by said power generator.

10. The system as claimed in claim 9, including an oxygen conduit extending from said oxygen generator to the oxy-fuel burners of the furnace to supply oxygen to the oxy-fuel burners.

11. The system as claimed in claim 9, including a nitrogen inlet conduit extending between said oxygen generator and a nitrogen store.

12. The system as claimed in claim 11, including a first nitrogen conduit extending between, and in flow communication with, said nitrogen store and said preheated air conduit.

13. The system as claimed in claim 11, including a second nitrogen conduit extending between said nitrogen store and an outlet conduit of said first and second regeneration assemblies.

14. The system as claimed in claim 11, including an exhaust conduit in flow communication with said exhaust reversal valve assembly and a third nitrogen conduit extending between said nitrogen store and said exhaust conduit.

15. A cassette regeneration system for an oxy-fuel fired furnace having oxy-fuel burners, said system comprising:

a first regeneration assembly, said first regeneration assembly including at least one removably connected first cassette regenerator, a first exhaust manifold assembly in flow communication with said at least one first cassette regenerator and a first regenerator header in flow communication with said at least one first cassette regenerator;

a second regeneration assembly, said second regeneration assembly including at least one removably connected second cassette regenerator, a second exhaust manifold assembly in flow communication with said at least one second cassette regenerator and a second regenerator header in flow communication with said at least one second cassette regenerator;

an exhaust reversal valve assembly in flow communication with said first and second regeneration assemblies configured to selectively direct exhaust from the furnace through a selected one of said first and second regeneration assemblies;

an air reversal valve assembly in flow communication with said first and second regeneration headers;

an air supply conduit in flow communication with said air reversal valve assembly, wherein said air reversal valve assembly is configured to selectively direct air flow through a selected one of said first and second cassette regenerators;

at least one preheated air conduit in flow communication with said air reversal valve assembly;

a turbine in flow communication with said preheated air conduit;

an electrical power generator connected to said turbine;

an oxygen generator powered by said power generator;

an oxygen conduit extending from said oxygen generator to the oxy-fuel burners of the furnace to supply oxygen to the oxy-fuel burners.

16. A method of heat recovery for an oxy-fuel fired furnace having oxy-fuel burners, comprising the steps of:

directing exhaust from the furnace to an exhaust reversal valve assembly;

selectively directing the exhaust through said exhaust reversal valve assembly to a first regeneration assembly, said first regeneration assembly including at least one removable cassette regenerator having filter media;

passing exhaust gas through said selected first regeneration assembly to heat said filter media in said first regenerator assembly;

directing air to an air reversal valve assembly;

selectively directing the air through said air reversal valve assembly into a second regeneration assembly having at least one removable cassette regenerator to heat the air; and directing the heated air to a turbine to turn the turbine.

17. The method as claimed in claim 16, including switching said exhaust reversal valve assembly such that the exhaust is directed to said second regeneration assembly, switching said air reversal valve assembly such that the air is directed to said first regeneration assembly to heat the air and directing the heated air to said turbine.

18. The method as claimed in claim 16, including directing exhaust from said first regeneration assembly to a cullet preheater to preheat cullet.

19. The method as claimed in claim 17, including using said turbine to power an electrical generator to produce electricity.

20. The method as claimed in claim 19, including using said electricity to power an oxygen generator to produce oxygen.

21. The method as claimed in claim 19, including directing nitrogen produced in said oxygen generator to a nitrogen store.

22. The method as claimed in claim 20, including directing oxygen produced in said oxygen generator to the oxy-fuel burners of the furnace.

23. The method as claimed in claim 21, including directing at least a portion of the nitrogen to said air reversal valve assembly.

24. The method as claimed in claim 21, including directing at least a portion of the nitrogen to an inlet of said turbine.

25. The method as claimed in claim 21, including directing at least a portion of the nitrogen to an inlet of a cullet preheater.

26. The method as claimed in claim 21, including mixing at least a portion of the nitrogen with the exhaust gas prior to discharging the exhaust gas mixture to the atmosphere.

27. A method of heat recovery for an oxy-fuel fired furnace having oxy-fuel burners, comprising the steps of:

directing exhaust from the furnace to an exhaust reversal valve assembly;

selectively directing the exhaust through said exhaust reversal valve assembly to a first regeneration assembly, said first regeneration assembly including at least one removable cassette regenerator having filter media;

passing exhaust gas through said selected first regeneration assembly to heat said filter media in said first regenerator assembly;

directing air to an air reversal valve assembly;

selectively directing the air through said air reversal valve assembly into a second regeneration assembly having at least one removable cassette regenerator to heat the air;

directing the heated air from said second regeneration assembly to a turbine to turn the turbine;

using said turbine to power an electrical generator to produce electricity;

using the electricity produced by said electrical generator to power an oxygen separator to produce oxygen; and directing the oxygen produced by said oxygen generator to the oxy-fuel burners of the furnace.

28. A regeneration system for an oxy-fuel fired furnace having oxy-fuel burners, said system comprising:

means for directing exhaust from the furnace to an exhaust reversal valve assembly;

means for selectively directing the exhaust through said exhaust reversal valve assembly to a first regeneration assembly, said first regeneration assembly including at least one removable cassette regenerator having filter media;

means for passing exhaust gas through said selected first regeneration assembly to heat said filter media in said first regenerator assembly;

means for directing air to an air reversal valve assembly;

means for selectively directing the air through said air reversal valve assembly into a second regeneration assembly having at least one removable cassette regenerator to heat the air; and means for directing the heated air to a turbine to turn the turbine.

* * * * *